United States Patent [19]
Wada et al.

[11] Patent Number: 5,852,542
[45] Date of Patent: Dec. 22, 1998

[54] MONOLITHIC CERAMIC CAPACITOR

[75] Inventors: Hiroyuki Wada; Harunobu Sano; Norihiko Sakamoto, all of Kyoto-fu, Japan

[73] Assignee: Murata Manufacturing Co., Ltd., Kyoto, Japan

[21] Appl. No.: 897,249

[22] Filed: Jul. 18, 1997

[30] Foreign Application Priority Data

Jul. 19, 1996 [JP] Japan ..................................... 8-190629
Oct. 31, 1996 [JP] Japan ..................................... 8-289887

[51] Int. Cl.$^6$ ............................ H01G 4/06; H01G 4/005; H01G 4/228; H01G 2/20
[52] U.S. Cl. ..................... 361/321.5; 361/321.4; 361/303; 361/305; 361/306.1; 361/306.3; 361/308.1; 361/309; 361/313; 361/321.1; 361/321.5; 361/320
[58] Field of Search ................. 361/311–313, 321.1, 361/321.2, 321.3, 321.4, 321.5, 301.1, 303–305, 306.1, 306.3, 308.1, 309, 320, 322; 501/134–137

[56] References Cited

U.S. PATENT DOCUMENTS 5,659,456 8/1997 Sano et al. ........................... 361/321.4

*Primary Examiner*—Bot L. Ledynh
*Attorney, Agent, or Firm*—Ostrolenk, Faber, Gerb & Soffen, LLP

[57] ABSTRACT

A monolithic ceramic capacitor has dielectric ceramic layers of a material comprising barium titanate having alkali metal oxides impurities in an amount of not more than about 0.02% by weight, manganese oxide, cobalt oxide, and nickel oxide; from about 0.5 to 5.0 mols MgO to 100 mols of a main constituent shown by the following composition formula;

$$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$$

wherein $M_2O_3$ is at least one of $Sc_2O_3$ and $Y_2O_3$; $Re_2O_3$ is at least one of $Sm_2O_3$ and $Eu_2O_3$ and $\alpha$, $\beta$, $\gamma$, m, x, and y are $0.0025 \leq \alpha+\beta \leq 0.025$
$0 \leq \beta \leq 0.0075$
$0.0025 \leq \gamma \leq 0.05$
$\gamma/(\alpha+\beta) \leq 4$
$0 \leq x < 1.0$
$0 \leq y < 1.0$
$0 \leq x+y < 1.0$
$1.000 < m \leq 1.035$;

an $Li_2O$—$B_2O_3$—(Si, Ti)$O_2$ oxide glass in an amount of from about 0.2 to 3.0 parts by weight to 100 parts by weight of the sum total of the main constituent and the magnesium oxide, and the internal electrodes are constituted by nickel or a nickel alloy.

15 Claims, 3 Drawing Sheets

MONOLITHIC CERAMIC CAPACITOR

BACKGROUND OF THE INVENTION

1. Field of the Invention

The present invention relates to a ceramic capacitor used for electronic instruments, and particularly to a monolithic ceramic capacitor having internal electrodes made up of nickel or a nickel alloy.

Hitherto, the production process for a monolithic ceramic capacitor is generally as follows. First, a sheet-form dielectric ceramic layer having coated on its surface an electrode material for forming an internal electrode is prepared. As the dielectric ceramic layer, a material composed of, for example, $BaTiO_3$ is used as the main component. Then, a laminate is prepared by laminating the sheet-form ceramic dielectric layers coated with the electrode material followed by being pressed and heated at 1250° to 1350° C. Thereby, a ceramic laminate having internal electrodes is obtained. Also, by plating an external electrode electrically connecting to the internal electrodes, a monolithic ceramic capacitor is obtained.

Accordingly, it is necessary that the material for the internal electrodes to meet the following conditions.

1. Because the ceramic laminate and the internal electrodes are simultaneously calcined, the material has a melting point of at least the calcination temperature of the ceramic laminate.
2. The material is not oxidized in an oxidative high-temperature atmosphere and does not react with the dielectric ceramic layer.

As the electrode meeting such conditions, noble metals such as platinum, gold, palladium or a silver-palladium alloy, etc., have been used. These electrode materials have excellent characteristics but on the other hand, because the material is expensive, the ratio of the electrode material cost to the monolithic ceramic capacitor cost reaches from 30 to 70%, which is the largest factor increasing the production cost.

As other materials having a high melting point, there are base metals such as Ni, Fe, Co, W, Mo, etc., but these base metals are easily oxidized in a high-temperature oxidative atmosphere and becomes useless as the electrode. Thus, to use these base metals as the internal electrodes of a monolithic ceramic capacitor, it is necessary that the base metal is calcined in a neutral or reducing atmosphere together with the dielectric ceramic layer. However, conventional dielectric ceramic materials have the fault that when the dielectric ceramic materials are calcined in such a neutral or reducing atmosphere, the material is greatly reduced and converted to semiconductors.

To overcome this fault, a dielectric ceramic material wherein the ratio of barium site/titanium site in the barium titanate solid solution is in excess of the stoichiometric ratio as shown in Examined Published Japanese Patent Application No. Sho 57-42588 and a dielectric ceramic material obtained by adding the oxide of a rare earth element such as La, Nd, Sm, Dy, Y, etc., to a barium titanate solid solution as shown in Unexamined Published Japanese Patent Application No. Sho 61-101459 are proposed.

Also, as dielectric ceramic materials having a lower temperature change of the dielectric constant, for example, the dielectric ceramic materials of the $BaTiO_3$—$CaZrO_3$—$MnO$—$MgO$ series composition shown in Unexamined Published Japanese Patent No. 62-256422 and a $BaTiO_3$—$(Mg, Zn, Sr, Ca)O$—$B_2O_3$—$SiO_2$ series composition shown in Examined Published Japanese Patent Application No. Sho 61-14611 are proposed.

By using such dielectric ceramic materials, a ceramic laminate which is not converted to a semiconductor by calcination in a reducing atmosphere can be obtained and the production of a monolithic ceramic capacitor using a base metal such as nickel, etc., as the internal electrodes becomes possible.

With the recent progress in electronics, small-sizing of electronic parts has proceeded rapidly and the tendency to small size and increase in capacity of the monolithic ceramic capacitor is remarkable. Accordingly, demand for a dielectric ceramic material having a high dielectric constant, showing a lower temperature change of the dielectric constant, and having excellent reliability has increased.

However, in the dielectric ceramic materials shown in Examined Published Japanese Patent Application No. Sho 57-42588 and Unexamined Published Japanese Patent No. Sho 61-101459, a large dielectric constant is obtained but there is the fault that the crystal particles of the ceramic laminate obtained are large and when the thickness of the dielectric ceramic layer in the monolithic ceramic capacitor becomes as thin as 10 $\mu$m or thinner, the number of the crystal particles in each layer is decreased and this lowers reliability. Also, there is a problem that the temperature change of the dielectric constant is large and it cannot be said that these materials sufficiently meet the demand of markets.

On the other hand, in the dielectric ceramic material shown in Unexamined Published Japanese Patent No. Sho 62-256422, the dielectric constant is relatively high, the crystal particles of the ceramic laminate obtained are small, and the temperature change of the dielectric constant is small, but because $CaZrO_3$ or $CaTiO_3$ formed during the calcination process is liable to form a secondary phase with MnO, there is a problem with reliability at high temperature.

Also, in the dielectric ceramic material shown in Examined Published Japanese Patent Application No. 61-14611, there is a fault that the dielectric constant obtained is from 2,000 to 2,800 and the material is disadvantageous from the view point of small-sizing and increasing the capacity of the monolithic ceramic capacitor. Furthermore, there is a problem that the material does not satisfy the X7R characteristics of the EIA Standard, that is the change ratio of the electrostatic capacity between the temperature range of from −55° to +125° C. is not within ±15%.

To solve the above-described problems, compositions are proposed in Unexamined Published Japanese Patent Application Nos. Hei 5-9066, Hei 5-9067, and Hei 5-9068. However, the market demand for reliability thereafter has become more severe and the demand for a dielectric ceramic material which is excellent in reliability has been increased. Also, at the same time, the demand for thinning the ceramic dielectric layer has become severe.

When in the case of thinning the ceramic dielectric layer, the rated voltage is to be the same as the rated voltage before thinning, the electric field applied per layer becomes large and thus the insulation resistance at room temperature and at a high temperature is lowered, whereby the reliability is greatly lowered. Thus, in conventional dielectric ceramic materials, it is required to lower the rated voltage when thinning the ceramic dielectric layer. Therefore, it is desired to provide a monolithic ceramic capacitor which does not need a lowering of the rated voltage by thinning the ceramic dielectric layer, has an insulation resistance under a high electric field strength, and has excellent reliability.

In a small-sized and large capacity monolithic ceramic capacitor, a plated film such as a soft solder, etc., is formed on a baked external electrode of an electrically conductive metal powder to cope with automatic surface packaging.

As the method of forming a plated film, an electrolytic plating method is general used. Usually, fine voids are formed in a baked electrode of an electrically conductive metal powder. Accordingly, there is a problem that when the monolithic ceramic capacitor is immersed in a plating liquid in the case of forming a plating film on the electrodes, the plating liquid permeates the voids of the baked electrodes and reaches the interface between the internal electrode and the dielectric ceramic layer to lower the reliability.

SUMMARY OF THE INVENTION

Thus, the primary object of the present invention is to provide a small-sized and large capacity monolithic ceramic capacitor at a low cost, wherein the dielectric constant is at least 3,000; when the insulation resistance is expressed by the product with the electrostatic capacity (CR product), the insulation resistances at room temperature and at 125° C. are high as at least 2,000 $M\Omega \cdot \mu F$ and at least 500 $M\Omega \cdot \mu F$ respectively; the temperature characteristics of the electrostatic capacity satisfies the B characteristics of the JIS Standard and the X7R characteristics of the EIA Standard; and the reliability is high regardless of the presence or absence of the plated layer.

The present invention has been made in view of the above-described object.

The present invention provides a monolithic ceramic capacitor comprising plural dielectric ceramic layers, plural internal electrodes between the above-described dielectric ceramic layers such that the end of each of the internal electrodes is alternatively exposed to different side surfaces of the above-described dielectric ceramic layer, and external electrodes formed such that they are electrically connected to the exposed internal electrodes, wherein the dielectric ceramic layers are constituted by a material comprising barium titanate having a content of alkali metal oxides as impurities in an amount of not more than about 0.02% by weight, at least one member selected from scandium oxide and yttrium oxide, at least one member selected from samarium oxide and europium oxide, manganese oxide, cobalt oxide, and nickel oxide; containing magnesium oxide as an accessory constituent in an amount of from about 0.5 to 5.0 mols as MgO to 100 mols of a main constituent shown by the following composition formula;

$$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$$

(wherein, $M_2O_3$ is at least one of $Sc_2O_3$ and $Y_2O_3$; $Re_2O_3$ is at least one of $Sm_2O_3$ and $Eu_2O_3$ and $\alpha$, $\beta$, $\gamma$, m, x, and y are $0.0025 \leq \alpha+\beta 0.025$ $0 \leq \beta \leq 0.0075$ $0.0025 \leq \gamma \leq 0.05$ $\gamma/(\alpha+\beta) \leq 4$

$0 \leq x < 1.0$ $0 \leq y < 1.0$ $0 \leq x+y < 1.0$ $1.000 < m \leq 1.035$);

and furthermore, containing an $Li_2O-B_2O_3-(Si, Ti)O_2$ series oxide glass in an amount of from about 0.2 to 3.0 parts by weight to 100 parts by weight of the sum of the above-described main constituent and above-described magnesium oxide, and the above-described internal electrodes are constituted by nickel or a nickel alloy.

Also, in the monolithic ceramic capacitor, it is preferred that in the triangular diagram of $\{Li_2O, B_2O_3, (Si_wTi_{1-w})$  $O_2\}$ (wherein $0.3 \leq w < 1.0$), the above-described $Li_2O-B_2O_3-(Si, Ti)O_2$ series oxide glass is in the inside of the region surrounded by 6 straight lines or on the lines linking 6 points of

A (0, 20, 80)

B (19, 1, 80)

C (49, 1, 50)

D (45, 50, 5)

E (20, 75, 5)

F (0, 80, 20)

and contains by addition at least one of $Al_2O_3$ and $ZrO_2$ in the sum total of not more than about 20 parts by weight (with a proviso that $ZrO_2$ is not more than about 10 parts by weight) to 100 parts by weight of the above-described constituents.

Also, in the monolithic ceramic capacitor, it is preferred that the above-described external electrode is constituted by a sintered layer of an electrically conductive metal powder or an electrically conductive metal powder mixed with a glass frit.

Furthermore, it is preferred that the above-described external electrode is composed of a first layer made up of sintered layer of an electrically conductive metal powder or an electrically conductive metal powder mixed with a glass frit and a second layer made up of a plated layer on the first layer.

DETAILED DESCRIPTION OF EMBODIMENTS OF THE INVENTION

In the monolithic ceramic capacitor of the present invention, by using the dielectric ceramic material having a composition ratio of barium titanate, at least one of scandium oxide and yttrium oxide, at least one of samarium oxide and europium oxide, manganese oxide, cobalt oxide, and nickel oxide adjusted as described above and containing in addition magnesium oxide and the $Li_2O-B_2O_3-(Si, Ti)O_2$ series oxide glass as the material for the dielectric ceramic layer, the material can be calcined in a reducing atmosphere without deteriorating its characteristics, and the monolithic ceramic capacitor satisfies the B characteristics of the JIS Standard and the X7R characteristics of the EIA Standard, and has a high insulation resistance and a high reliability at room temperature and at a high temperature under a high electric field strength.

Also, because the crystal grain sizes of the dielectric ceramic laminate obtained are small as 1 $\mu$m or smaller, the number of the crystal grains existing in each dielectric layer can be increased and thus lowering of the reliability can be prevented when thinning the thickness of the dielectric ceramic layer of the monolithic ceramic capacitor.

In addition, it has been confirmed that in the present invention, of the alkaline earth metal oxides such as SrO, CaO, etc., the alkali metal oxides such as $Na_2O$, $K_2O$, etc., and other oxides such as $Al_2O_3$, $SiO_2$, etc., existing as impurities in barium titanate in the above-described main constituents, the content of particularly the alkali metal oxides such as $Na_2O$, $K_2O$, etc., has a large influence on the electric characteristics. That is, it has been confirmed that by using barium titanate wherein the content of the alkali metal oxides existing as impurities are less than about 0.02% by weight, the dielectric constant of 3,000 or higher is obtained.

Also, it has been confirmed that by adding an oxide glass mainly composed of $Li_2O$—$B_2O_3$—(Si, Ti)$O_2$ into the dielectric ceramic layer, the sintering property becomes good and also plating resistance is improved. Furthermore, by adding $Al_2O_3$ and $ZrO_2$ to the oxide glass mainly composed of $Li_2O$—$B_2O_3$—(Si, Ti)$O_2$, it becomes possible to obtain a higher insulation resistance.

When a dielectric ceramic layer is formed using the dielectric ceramic material as described above, a small-sized and large capacity monolithic ceramic capacitor capable of coping with automatic surface packaging, showing a small temperature change of the electrostatic capacity, and having a high reliability can be realized, and also nickel or a nickel alloy can be used as the internal electrodes. Also, a small amount of a ceramic powder can be added together with nickel or a nickel alloy.

Also, there is no particular restriction on the composition of the external electrodes. Practically, the external electrode may be constituted by, for example, a sintered layer of the powder of each of various electrically conductive metals such as Ag, Pd, Ag—Pd, Cu, Cu alloys, etc., or a sintered layer of the above-described electrically conductive metal powder compounded with various glass frits such as the $B_2O_3$—$Li_2O$—$SiO_2$—BaO series, $B_2O_3$—$SiO_2$—BaO series, $Li_2O$—$SiO_2$—BaO series, $B_2O_3$—$SiO_2$—ZnO series, etc. Also, a small amount of a ceramic powder may be added to the electrically conductive metal powder and the glass frit. More preferably, when a plated layer is formed on the sintered layer, the plated layer may be only a plated layer made up of Ni, Cu, an Ni—Cu alloy, etc., and may further have thereon a plated layer of a soft solder, tin, etc.

The present invention will be practically explained based on the following examples but the present invention is not limited by such examples.

Figure 1:
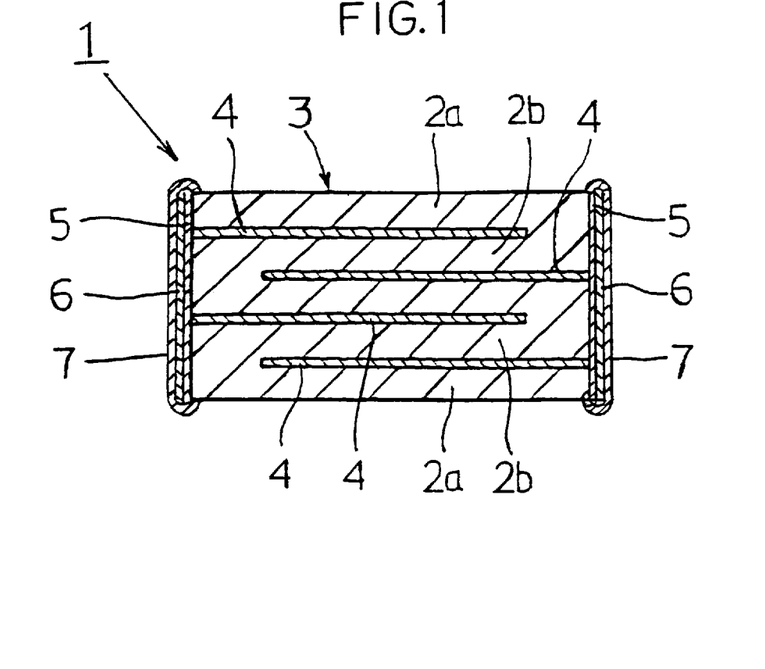
FIG. 1 is a schematic cross-sectional view showing an embodiment of the monolithic ceramic capacitor of the present invention.
Figure 2:
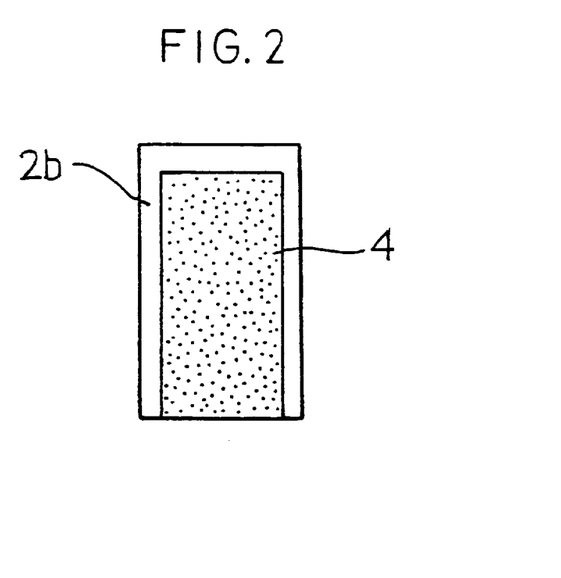
FIG. 2 is a schematic plane view showing an embodiment of the dielectric ceramic layer having an internal electrode in the present invention.
Figure 3:
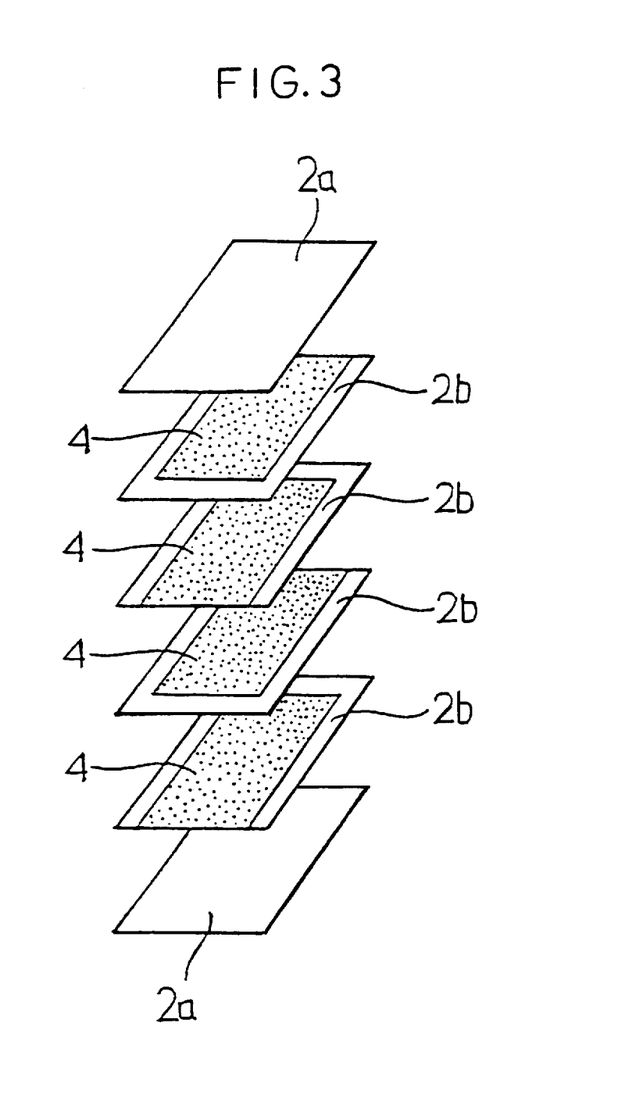
FIG. 3 is an exploded slant view showing an embodiment of the ceramic laminate of this invention.

First, an embodiment of the monolithic ceramic capacitor of the present invention is explained by referring to the accompanying drawings. FIG. 1 is a schematic cross-sectional view showing an embodiment of the monolithic ceramic capacitor of the present invention, FIG. 2 is a schematic plane view showing an embodiment of the laminated ceramic layer of the present invention having an internal electrode, and FIG. 3 is an exploded slant view showing an embodiment of the present invention.

As shown in FIG. 1, the monolithic ceramic capacitor 1 of the present invention is a rectangular form chip-type monolithic ceramic capacitor prepared by forming external electrodes 5, a first layer 6 of nickel, copper, etc., and a second layer 7 of a soft solder, tin, etc., at both the side surfaces of a ceramic laminate 3 obtained by laminating plural dielectric ceramic layers 2a, 2b with internal electrodes 4 between the dielectric ceramic layers.

Next, the production method of the monolithic ceramic capacitor 1 of the present invention is explained in the order of the production steps.

First, a ceramic laminate 3 is formed. The ceramic laminate 3 is produced as follows. As shown in FIG. 2, a dielectric ceramic layer 2b (green sheet) is prepared by forming a sheet of a slurry comprising the main constituents composed of barium titanate, at least one of scandium oxide and yttrium oxide, at least one of samarium oxide and europium oxide, manganese oxide, cobalt oxide, and nickel oxide, magnesium oxide, and powders composed of an $Li_2O$—$B_2O_3$—(Si, Ti)$O_2$ series oxide glass, and an internal electrode 4 composed of nickel or a nickel alloy is formed on one surface thereof. In addition, the internal electrode 4 may be formed by a screen printing, etc., or may be formed by a vapor-deposition method or a plating method. A necessary number of the dielectric ceramic layers 2b each having an internal electrode are laminated and as shown in FIG. 3, the laminated layers are placed between dielectric ceramic layers 2a having no internal electrode and pressed together to provide a laminate. Thereafter, the laminated dielectric ceramic layers 2a, 2b . . . 2b, 2a are calcined in a reducing atmosphere to form the ceramic laminate 3.

Then two external electrodes 5 are formed at the side surfaces of the ceramic laminate 3 such that they are connected to the internal electrodes 4. As material for the external electrodes 5, the same material as the internal electrodes 4 can be used. Also, silver, palladium, a silver-palladium alloy, copper, a copper alloy, etc., can be used. Also the foregoing metal powder mixed with a glass frit of a $B_2O_3$—$SiO_2$—BaO series glass, a $Li_2O$—$SiO_2$—BaO series glass, etc., can be used. By considering the use, place of use, etc., of the monolithic ceramic capacitor 1, a proper material is selected. The external electrodes 5 can be formed by coating a metal powder paste, which becomes the electrode, on the ceramic laminate 3 obtained by calcination followed by baking but the paste may also coated before calcination and the external electrodes may be formed simultaneously with the ceramic laminate 3. Thereafter, plating of nickel, copper, etc., is applied onto the external electrodes 5 to form a first layer 6. Finally, a plated second layer 7 of a soft solder, tin, etc., is formed on the plated first layer 6 to produce a chip-type monolithic ceramic capacitor 1.

EXAMPLE 1

First, as the starting materials, $TiCl_4$ and $Ba(NO_3)_2$ having various purities were prepared and after weighing, they were precipitated as barium titanyl oxalate $\{BaTiO(C_2O_4).4H_2O\}$ with oxalic acid. By heat-decomposing the precipitates at a temperature of 1000° C. or higher, the 4 kinds of barium titanate ($BaTiO_3$) shown in Table 1 below were synthesized.

TABLE 1

| Kind of $BaTiO_3$ | Content of Impurities (wt %) | | | | | Mean Particle Size ($\mu$m) |
| --- | --- | --- | --- | --- | --- | --- |
| | Alkali Metal Oxide | SrO | CaO | $SiO_2$ | $Al_2O_3$ | |
| A | 0.003 | 0.012 | 0.001 | 0.010 | 0.005 | 0.60 |
| B | 0.020 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

Also, oxides, carbonates and hydroxides were weighed and combined such that the composition ratio of $0.25Li_2O$—$0.30B_2O_3$—$0.03TiO_2$—$0.42SiO_2$ (mol ratio) was obtained after mixing and grinding and evaporating to dryness to provide a power. The powder was placed in an alumina crucible and after melting by heating at 1300° C., quickly cooled and ground the molten powder ground to produce an oxide glass powder having a mean grain size of 1 $\mu$m or smaller.

Then, $BaCO_3$ for adjusting the Ba/Ti mol ratio (m) of barium titanate and $Sc_2O_3$, $Y_2O_3$, $Sm_2O_3$, $Eu_2O_3$, $MnCO_3$, NiO, $Co_2O_3$, and MgO each having a purity of at least 99% were prepared. These raw material powders were compounded with the above-described oxide glass powder such that the composition ratios shown in Table 2 were obtained to provide compounded products. To each of the compounded products were added a polyvinyl butyral series binder and an organic solvent such as ethanol, etc., and the resultant mixture was wet-mixed in a ball mill to provide a ceramic slurry. Using the ceramic slurry, a sheet was formed by the doctor blade method to provide a rectangular green sheet having a thickness of 11 μm. Then, an electrically conductive paste mainly composed of Ni was screen-printed on the ceramic green sheet to form an electrically conductive paste layer for constituting the internal electrode.

in length and 1.2 mm in thickness, and the thickness of the dielectric ceramic layer disposed between the internal electrodes was 8 μm. Also, the total number of the effective dielectric ceramic layers was 19 and the area of the counter electrode per layer was 2.1 mm$^2$.

The electric characteristics were measured. The electrostatic capacity (C) and the dielectric loss (tan δ) were measured using an automatic bridge-type measurement instrument at a frequency of 1 kHz, 1 Vrms and at a temperature of 25° C., and the dielectric constant (ε) was calculated from the electrostatic capacity. Then, using an insulation resistance meter, a direct current voltage of 16 volts was applied for 2 minutes and the insulation resistances (R) at 25° C. and at 125° C. were measured and the product of the electrostatic capacity (C) and the insulation resistance (R), that is the CR product, was determined.

TABLE 2

| Sample No. | Kind of BaTiO$_3$ | $(1 - \alpha - \beta - \gamma)\{BaO\}_m \cdot TiO_3 + \alpha M_2O_3 + \beta Re_2O_3 + \gamma(Mn_{1-x-y}Ni_xCo_y)O$ | | | | | | | | | | | | | Addition Amount of Oxide Glass |
|---|---|---|---|---|---|---|---|---|---|---|---|---|---|---|---|
| | | M | | Re | | | | | γ/ | | | | | | |
| | | Sc | Y | Sm | Eu | α + β | β | β/α | γ | (α + β) | x | y | x + y | m | MgO | |
| *1 | A | | 0.0050 | | | 0.0000 | 0.0000 | | 0.0260 | | 0.20 | 0.20 | 0.40 | 1.015 | 1.00 | 1.00 |
| *2 | A | | 0.0050 | 0.0010 | | 0.0060 | 0.0010 | 0.20 | 0.0000 | | 0.00 | 0.00 | 0.00 | 1.010 | 1.00 | 0.80 |
| *3 | A | | 0.0080 | | | 0.0080 | 0.0000 | | 0.0150 | 1.9 | 0.10 | 0.10 | 0.20 | 1.010 | 0.80 | 1.50 |
| *4 | A | | 0.0050 | | 0.0010 | 0.0060 | 0.0010 | 0.20 | 0.0200 | 3.3 | 0.20 | 0.20 | 0.40 | 0.990 | 1.00 | 1.20 |
| *5 | A | | 0.0060 | 0.0015 | | 0.0075 | 0.0015 | 0.25 | 0.0250 | 3.3 | 0.20 | 0.40 | 0.60 | 1.000 | 1.20 | 0.80 |
| *6 | A | | 0.0080 | 0.0020 | | 0.0100 | 0.0020 | 0.25 | 0.0200 | 2.0 | 0.10 | 0.10 | 0.20 | 1.015 | 0.10 | 1.00 |
| *7 | A | | 0.0075 | 0.0025 | | 0.0100 | 0.0025 | 0.33 | 0.0200 | 2.0 | 0.30 | 0.10 | 0.40 | 1.015 | 0.80 | 0.00 |
| 8 | B | | 0.0015 | | 0.0010 | 0.0025 | 0.0010 | 0.67 | 0.0025 | 1.0 | 0.30 | 0.10 | 0.40 | 1.015 | 1.00 | 0.80 |
| 9 | A | | 0.0200 | 0.0050 | | 0.0250 | 0.0050 | 0.25 | 0.0500 | 2.0 | 0.05 | 0.10 | 0.15 | 1.010 | 1.00 | 1.20 |
| 10 | A | | 0.0075 | 0.0025 | | 0.0100 | 0.0025 | 0.33 | 0.0400 | 4.0 | 0.10 | 0.30 | 0.40 | 1.005 | 1.20 | 1.00 |
| 11 | C | | 0.0125 | 0.0075 | | 0.0200 | 0.0075 | 0.60 | 0.0400 | 2.0 | 0.00 | 0.00 | 0.00 | 1.015 | 1.00 | 1.50 |
| 12 | A | | 0.0050 | 0.0050 | | 0.0100 | 0.0050 | 1.00 | 0.0300 | 3.0 | 0.10 | 0.20 | 0.30 | 1.035 | 0.80 | 1.50 |
| 13 | A | 0.0010 | 0.0050 | 0.0010 | | 0.0070 | 0.0010 | 0.17 | 0.0200 | 2.9 | 0.00 | 0.60 | 0.60 | 1.010 | 1.20 | 1.50 |
| 14 | A | | 0.0060 | 0.0010 | | 0.0070 | 0.0010 | 0.17 | 0.0150 | 2.1 | 0.50 | 0.00 | 0.50 | 1.015 | 1.00 | 1.20 |
| 15 | A | 0.0005 | 0.0055 | 0.0005 | 0.0005 | 0.0070 | 0.0010 | 0.17 | 0.0250 | 3.6 | 0.10 | 0.10 | 0.20 | 1.010 | 1.20 | 3.00 |
| 16 | A | | 0.0060 | 0.0010 | 0.0010 | 0.0080 | 0.0020 | 0.33 | 0.0250 | 3.1 | 0.05 | 0.20 | 0.25 | 1.015 | 0.50 | 0.20 |
| 17 | A | | 0.0050 | 0.0010 | | 0.0060 | 0.0010 | 0.20 | 0.0200 | 3.3 | 0.10 | 0.30 | 0.40 | 1.005 | 5.00 | 1.50 |
| 18 | A | | 0.0040 | 0.0050 | | 0.0090 | 0.0050 | 1.25 | 0.0250 | 2.8 | 0.10 | 0.10 | 0.20 | 1.015 | 1.20 | 1.00 |
| *19 | A | | 0.0240 | 0.0060 | | 0.0300 | 0.0060 | 0.25 | 0.0150 | 0.5 | 0.10 | 0.10 | 0.20 | 1.010 | 1.20 | 1.00 |
| *20 | A | | 0.0180 | 0.0030 | | 0.0210 | 0.0030 | 0.17 | 0.0800 | 3.8 | 0.30 | 0.10 | 0.40 | 1.010 | 1.00 | 1.00 |
| *21 | A | | 0.0060 | 0.0015 | | 0.0075 | 0.0015 | 0.25 | 0.0400 | 5.3 | 0.20 | 0.20 | 0.40 | 1.015 | 1.00 | 0.80 |
| *22 | A | | 0.0050 | | 0.0090 | 0.0140 | 0.0090 | 1.80 | 0.0300 | 2.1 | 0.10 | 0.30 | 0.40 | 1.015 | 0.80 | 0.80 |
| *23 | A | | 0.0050 | | 0.0010 | 0.0060 | 0.0010 | 0.20 | 0.0150 | 2.5 | 1.00 | 0.00 | 1.00 | 1.010 | 0.80 | 1.00 |
| *24 | A | | 0.0075 | 0.0025 | | 0.0100 | 0.0025 | 0.33 | 0.0150 | 1.5 | 0.00 | 1.00 | 1.00 | 1.010 | 1.20 | 1.00 |
| *25 | A | | 0.0060 | 0.0015 | | 0.0075 | 0.0015 | 0.25 | 0.0120 | 1.6 | 0.40 | 0.60 | 1.00 | 1.010 | 0.80 | 1.20 |
| *26 | A | | 0.0080 | 0.0020 | | 0.0100 | 0.0020 | 0.25 | 0.0200 | 2.0 | 0.10 | 0.30 | 0.40 | 1.050 | 1.00 | 1.20 |
| *27 | A | | 0.0060 | 0.0010 | | 0.0070 | 0.0010 | 0.17 | 0.0200 | 2.9 | 0.20 | 0.20 | 0.40 | 1.010 | 8.00 | 1.50 |
| *28 | A | | 0.0060 | 0.0015 | | 0.0075 | 0.0015 | 0.25 | 0.0250 | 3.3 | 0.10 | 0.10 | 0.20 | 1.010 | 1.00 | 6.00 |
| *29 | D | | 0.0080 | 0.0020 | | 0.0100 | 0.0020 | 0.25 | 0.0300 | 3.0 | 0.10 | 0.20 | 0.30 | 1.005 | 1.00 | 1.00 |

* is Outside the Range of the Invention

The plural ceramic green sheets having formed thereon the electrically conductive paste layer were laminated such that the protruded sides of the conductive paste layers were alternated to provide a laminate. After eliminating the binder by heating the laminate in an $N_2$ atmosphere at a temperature of 350° C., the laminate was calcined in a reducing atmosphere of an $H_2$—$N_2$—$H_2O$ gas of an oxygen partial pressure of from $10^{-9}$ to $10^{-12}$ MPa for 2 hours at the temperature shown in Table 3 below to provide a ceramic laminate.

After calcination, a silver paste containing a $B_2O_3$—$Li_2O$—$SiO_2$—Bao series glass frit was coated on both the side surfaces of the ceramic laminate obtained and baked in an $N_2$ atmosphere at a temperature of 600° C. to form external electrodes electrically connected to the internal electrodes.

The outside dimensions of the laminated condenser obtained as described above were 1.6 mm in width, 3.2 mm Furthermore, for measuring the insulation resistance (R) at an electric field of 20 kV/mm, a direct current voltage of 160 V was applied for 2 minutes and the insulation resistances (R) at 25° C. and at 125° C. were measured similarly and the CR product, was determined.

The change ratio of the electrostatic capacity to temperature change was measured.

In particular, the change ratio (ΔC/C20° C.) at −25° C. and at 85° C. using the electrostatic capacity at 20° C. as the standard, the change ratio (ΔC/C25° C.) at −55° C. and at 125° C. using the electrostatic capacity at 25° C. as the standard, and the absolute value ($|\Delta C|_{max}$) of the largest change ratio within the range of from −55° C. to 125° C. was were shown.

Also, as a high-temperature load life test, using 36 each samples, a direct current voltage of 100 V was applied at 150° C. and the change of the insulation resistance with the passage of time was measured. The time the high-temperature load life test when the insulation resistance (R) of each sample became $10^6$ Ω or lower was defined as the life time and the mean life time was shown. The results are shown in Table 3 below.

TABLE 3

| Sample No. | Firing Temperature (°C.) | Dielectric Constant ε | Dielectric Loss tan δ (%) | Capacity Temperature Change Ratio ΔC/C20° C. (%) −25° C. | 85° C. | Capacity Temperature Change Ratio ΔC/C20° C. (%) −55° C. | 125° C. | max | CR Product (25° C.) (MΩ · μF) 20 kV/mm applied 25° C. | 125° C. | CR Product (125° C.) (MΩ · μF) 20 kV/mm applied 25° C. | 125° C. | Mean Life Time (h) | Grain Size (μm) |
|---|---|---|---|---|---|---|---|---|---|---|---|---|---|---|
| *1 | 1280 | 2850 | 2.4 | −4.8 | 17.8 | −11.0 | 12.8 | 26.1 | 6320 | 2460 | 5230 | 480 | 44 | 0.89 |
| *2 | 1300 | | | Unmeasurable owing to Becoming Semiconductor | | | | | | | | | | 2.1 |
| *3 | 1280 | 3440 | 2.0 | −0.4 | −7.4 | −1.2 | −9.2 | 9.2 | 6980 | 2820 | 3010 | 730 | 319 | 0.75 |
| *4 | 1280 | | | Unmeasurable owing to Becoming Semiconductor | | | | | | | | | | 1.7 |
| *5 | 1280 | 3320 | 2.2 | −0.2 | −9.5 | −0.5 | −10.6 | 10.6 | 5130 | 1580 | 1760 | 450 | 288 | 0.72 |
| *6 | 1300 | 3500 | 2.3 | 1.2 | −9.6 | 1.0 | −18.1 | 19.7 | 4000 | 1410 | 1520 | 340 | 212 | 0.77 |
| *7 | 1360 | | | Unmeasurable owing to Sintering Deficiency | | | | | | | | | | 0.61 |
| 8 | 1300 | 3250 | 1.9 | −0.3 | −9.4 | −0.9 | −10.4 | 10.4 | 7160 | 2810 | 2980 | 840 | 565 | 0.65 |
| 9 | 1300 | 3100 | 1.8 | 0.0 | −7.9 | −0.5 | −9.0 | 9.0 | 5970 | 2240 | 2480 | 610 | 658 | 0.68 |
| 10 | 1280 | 3220 | 1.8 | 0.2 | −8.8 | −0.4 | −9.8 | 9.8 | 7400 | 2750 | 2920 | 710 | 564 | 0.69 |
| 11 | 1300 | 3020 | 1.4 | 0.5 | −8.5 | 0.6 | −12.8 | 12.8 | 6580 | 2430 | 2600 | 720 | 602 | 0.79 |
| 12 | 1300 | 3010 | 1.5 | 0.3 | −9.2 | 0.6 | −13.0 | 13.0 | 6680 | 2450 | 2570 | 570 | 617 | 0.67 |
| 13 | 1300 | 3200 | 1.5 | −0.1 | −8.0 | −0.9 | −8.6 | 8.6 | 6100 | 2280 | 2410 | 630 | 653 | 0.69 |
| 14 | 1300 | 3070 | 1.5 | 0.0 | −7.4 | −0.7 | −8.3 | 8.3 | 7760 | 2880 | 3080 | 640 | 510 | 0.68 |
| 15 | 1300 | 3040 | 1.4 | −0.9 | −6.0 | −2.0 | −7.0 | 7.0 | 6410 | 2320 | 2440 | 580 | 583 | 0.67 |
| 16 | 1300 | 3180 | 1.8 | −0.3 | −8.2 | −1.3 | −9.4 | 9.4 | 6810 | 2280 | 2710 | 640 | 592 | 0.69 |
| 17 | 1300 | 3110 | 1.5 | 0.7 | −6.7 | −0.1 | −11.7 | 11.7 | 6920 | 2740 | 2770 | 650 | 560 | 0.68 |
| 18 | 1300 | 3220 | 1.7 | 1.0 | −9.8 | 1.4 | −14.8 | 14.8 | 7010 | 2780 | 2800 | 650 | 565 | 0.69 |
| *19 | 1360 | 2180 | 1.6 | −0.3 | −7.0 | −1.2 | −8.3 | 8.3 | 2660 | 920 | 1000 | 300 | 218 | 0.65 |
| *20 | 1300 | 3470 | 1.8 | 1.5 | −12.3 | 0.9 | −18.0 | 18.0 | 6100 | 1440 | 3830 | 480 | 331 | 0.75 |
| *21 | 1300 | 3420 | 1.7 | 1.3 | −12.2 | 0.8 | −18.6 | 18.6 | 6020 | 1710 | 2070 | 540 | 382 | 0.74 |
| *22 | 1300 | 3380 | 2.1 | 2.8 | −12.0 | 3.4 | −17.6 | 17.6 | 6660 | 2310 | 2590 | 600 | 572 | 0.74 |
| *23 | 1300 | 3280 | 1.9 | −0.2 | −9.7 | −0.5 | −11.7 | 11.7 | 3680 | 650 | 1420 | 390 | 176 | 0.73 |
| *24 | 1300 | 3100 | 1.3 | −0.5 | −7.4 | −1.4 | −8.6 | 8.6 | 3800 | 540 | 1120 | 260 | 231 | 0.70 |
| *25 | 1300 | 3150 | 1.6 | −0.2 | −7.8 | 0.6 | −12.5 | 12.5 | 3220 | 980 | 1160 | 230 | 174 | 0.70 |
| *26 | 1360 | | | Unmeasurable owing to Sintering Deficiency | | | | | | | | | | 0.61 |
| *27 | 1360 | 2430 | 1.0 | −0.1 | −5.7 | −1.4 | −6.9 | 6.9 | 6360 | 2320 | 3180 | 630 | 422 | 0.66 |
| *28 | 1260 | 2090 | 1.7 | −0.8 | −2.2 | −0.9 | 5.9 | 5.9 | 6720 | 3660 | 2340 | 520 | 522 | 0.71 |
| *29 | 1300 | 2490 | 1.6 | 0.4 | −5.0 | 0.8 | −6.2 | 6.2 | 6980 | 2320 | 2720 | 570 | 512 | 0.67 |

Mark * is Outside the Range of the Invention

As is clear from Table 1, Table 2 and Table 3, it can be seen that in the monolithic ceramic capacitor of the present invention, the dielectric constant ε is high as 3,000 or higher, the dielectric loss tan δ is 2.5% or lower, and the change ratio of the electrostatic capacity to the temperature satisfies the B characteristic of the JIS Standard in the range of from −25° C. to 85° C. and satisfies the X7R characteristic of the EIA Standard in the range of from −55° C. to 125° C.

Furthermore, the insulation resistances at 25° C. and at 125° C. under a high electric field strength of 20 kV/mm show high values of 2000 MΩ·μm or higher and 500 MΩ·μm or higher, respectively. Also, the mean life time is long as 500 hours or longer. Furthermore, the calcination temperature is relatively low, 1300° C. or lower, and the grain size is small, 1 μm or smaller.

Now, the reasons of limiting the compositions in the present invention are explained.

The reason for limiting the sum of α and β in $(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ (wherein, $M_2O_3$ is at least one of $Sc_2O_3$ and $Y_2O_3$; $Re_2O_3$ is at least one of $Sm_2O_3$ and $Eu_2O_3$) to the range of $0.0025 \leq \alpha+\beta < 0.025$, preferably about 0.006–0.02, is that when "α+β" representing the ($M_2O_3 + Re_2O_3$) amount is less than about 0.0025 as in Sample No. 1, the dielectric constant ε is lower than 3,000 and temperature change ratio of the electrostatic capacity becomes large. Also, the insulation resistance in the case of applying 20 kg/mm at 125° C. is lowered and also the mean life time is extremely shortened.

On the other hand, when "α+β" representing the ($M_2O_3 + Re_2O_3$) amount is more than about 0.025 as in Sample No. 19, the dielectric constant does not exceed 3,000, the insulation resistances at 25° C. and at 125° C. are lowered, the mean life time becomes short, and the calcination temperature is increased.

Also, the reason for limiting β to the range of 0<β≦about 0.0075, preferably about 0.001–0.005, the high-temperature load life test, is that when β representing the $Re_2O_3$ amount is 0 as in Sample No. 3, the mean life time becomes shorter than 500 hours.

On the other hand, when β is over about 0.0075 as in Sample No. 22, the temperature change ratio of the electrostatic capacity becomes large and the sample does not satisfy the B characteristics of the JIS Standard and the X7R characteristics of the EIA Standard.

Also, the reason for limiting γ to the range of 0.0015≦γ≦0.05, preferably about 0.0025–0.04, is that when e representing the (Mn, Ni, Co)O amount is less than about 0.0015 as in Sample No. 2, and the sample is calcined in a reducing atmosphere, the dielectric ceramic is reduced to be converted to a semiconductor and the insulation resistance is lowered.

On the other hand, when γ representing the (Mn, Ni, Co)O amount is over about 0.05 as in Sample No. 20, the insulation resistance at 125° C. is lowered regardless of the electric field strength, the mean life time is shortened, and further, the temperature change ratio of the electrostatic capacity is increased.

Also, the reason for limiting x+y to the range of $0 \leq x+y<1.0$, preferably about 0.15–0.5, is that when x+y=1.00 without containing Mn as in Sample Nos. 23, 24, and 25, the insulation resistance is lowered and the mean life time becomes shorter than 500 hours.

Also, the reason for limiting $\gamma/(\alpha+\beta)$ to the range of $\gamma/(\alpha+\beta)<4$, preferably about 3.6 or less, is that when the that ratio $\gamma/(\alpha+\beta)$ of the ($M_2O_3+Re_2O_3$) amount, "$\alpha+\beta$" and the (Mn, Ni, Co)O amount, $\gamma$ is over about 4 as in Sample No. 21, the temperature change ratio of the electrostatic capacity becomes large and the mean life becomes shorter than 500 hours.

Also, the reason for limiting m to the range of $1.000<m \leq 1.035$, preferably about 1.005–1.03, is that when the mol ratio m of barium titanate is less than 1.000 as in Sample No. 4, the sample is converted to a semiconductor and when the mol ratio m of barium titanate is 1.000 as in Sample No. 5, the insulation resistance is lowered and the mean life time becomes shorter than 500 hours.

On the other hand, when the mol ratio m is over about 1.035 as in Sample No. 26, the sintering property is extremely deteriorated.

Also, the reason for limiting magnesium oxide to the range of from about 0.5 to 5.0 mols converted as MgO, preferably about 1–4 mol, is that when the MgO amount is less than about 0.5 mol as in Sample No. 6, the insulation resistance is lowered and the mean life time becomes shorter than 500 hours. Furthermore, although the temperature change ratio of the electrostatic capacity satisfies the B characteristics of the JIS Standard, it does not satisfy the X7R characteristics of the EIA Standard.

On the other hand, when the addition amount of MgO is over about 5 mols as in Sample Nos. 27, the sintering temperature becomes high, the dielectric constant does not exceed 3,000, and the mean life time is shorter than 500 hours.

Also, the reason for limiting the addition amount of the $Li_2O$—$B_2O_3$—(Si, Ti)$O_2$ series oxide glass to the range of about 0.2 to 3.0 parts by weight, preferably about 1–2.5, is that when the addition amount of the $Li_2O$—$B_2O_3$—(Si, Ti)$O_2$ series oxide glass is less than about 0.2 part by weight as in Sample No. 7, sintering becomes insufficient.

On the other hand, when the addition amount of the $Li_2O$—$B_2O_3$—(Si, Ti)$O_2$ series oxide glass is over about 3.0 parts by weight as in Sample No. 28, the dielectric constant is lowered.

Also, the reason for limiting the content of alkali metal oxides contained in barium titanate as impurities to about 0.02% by weight or lower is that when the content of the alkali metal oxides is over about 0.02% by weight as in Sample No. 29, lowering of the dielectric constant occurs.

In addition, there is no particular restriction on the ratio ($\beta/\alpha$) of the $Re_2O_3$ amount, $\beta$, to the $M_2O_3$ amount, $\alpha$, but in order that the temperature change ratio of the electrostatic capacity has a surplus from the allowable value of the standard, it is preferred that $\beta/\alpha \leq 1$, preferably $\leq 0.7$.

EXAMPLE 2

As a dielectric ceramic material, raw materials obtained by compounding 100 mols of the composition formula using barium titanate of A in Table 1, 97.0 $\{BaO\}_{1.015}.TiO_2$+ $0.6Y_2O_3+0.4Eu_2O_3+2.0(Mn_{0.4}Ni_{0.4}Co_{0.2})O$ (mol ratio) with 0.8 mol of MgO was prepared, a $Li_2O$—$B_2O_3$—(Si, Ti)$O_2$ series oxide glass having a mean grain size of 1 μm or smaller shown in Table 4 prepared by heating at a temperature of from 1200° C. to 1500° C. by the same method as in Example 1 was added to the raw materials, and each monolithic ceramic capacitor having formed thereon external electrodes made up of silver electrically connected to internal electrodes was prepared by the same method as in Example 1. In addition, the external dimensions, etc., of the monolithic ceramic capacitor prepared were same as those in Example 1. The electric characteristics were measured.

TABLE 4

| Sample No. | Addition Amount of Oxide Glass (wt. %) | Components of Oxide Glass | | | | Added Components (weight parts) | |
|---|---|---|---|---|---|---|---|
| | | Main Constituents (mol %) | | | | | |
| | | $LiO_2$ | $B_2O_3$ | $(Si_wTi_{1-w})O_2$ | | $Al_2O_3$ | $ZrO_3$ |
| | | | | | w | | |
| 101 | 1.0 | 0 | 20 | 80 | 0.7 | | |
| 102 | 1.0 | 19 | 1 | 80 | 0.7 | | |
| 103 | 1.0 | 49 | 1 | 50 | 0.8 | | |
| 104 | 1.0 | 45 | 50 | 5 | 0.5 | | |
| 105 | 1.0 | 20 | 75 | 5 | 0.4 | | |
| 106 | 1.0 | 0 | 80 | 20 | 0.4 | | |
| 107 | 1.0 | 35 | 15 | 50 | 0.5 | | |
| 108 | 1.0 | 35 | 50 | 15 | 0.9 | | |
| 109 | 1.0 | 20 | 40 | 40 | 0.3 | | |
| 110 | 1.0 | 10 | 15 | 75 | 0.7 | | |
| 111 | 1.0 | 10 | 70 | 20 | 0.4 | 5 | 2 |
| 112 | 1.0 | 35 | 15 | 50 | 0.7 | 15 | 5 |
| 113 | 1.0 | 35 | 15 | 50 | 0.7 | 20 | |
| 114 | 1.0 | 35 | 15 | 50 | 0.7 | | 10 |
| *115 | 1.0 | 10 | 5 | 85 | 0.5 | | |
| *116 | 1.0 | 55 | 20 | 25 | 0.7 | | |
| *117 | 1.0 | 35 | 62 | 3 | 0.7 | | |
| *118 | 1.0 | 5 | 85 | 10 | 0.7 | | |
| *119 | 1.0 | 10 | 15 | 75 | 0.1 | | |
| *120 | 1.0 | 35 | 50 | 15 | 1.0 | | |
| *121 | 1.0 | 35 | 50 | 15 | 0.7 | 30 | |
| *122 | 1.0 | 35 | 50 | 15 | 0.7 | | 20 |

The electrostatic capacity (C) and the dielectric loss (tan δ) were measured using an automatic bridge-type measurement instrument at a frequency of 1 kHz, 1 Vrms, and at a temperature of 25° C. and from the dielectric constant ($\epsilon$) was calculated from the electrostatic capacity.

Then, for measuring the insulation resistance (R) at an electric field of 20 kV/mm, using an insulation resistance meter, a direct current voltage of 160 V was applied for 2 minutes, the insulation resistances (R) at 25° C. and at 125° C. were measured, and the product of the electrostatic capacity (C) and the insulation resistance (R), that is the CR product, was determined. Also, the change ratio of the electrostatic capacity to a temperature change was measured; the change ratio ($\Delta C/C20°$ C.) at −25° C. and at 85° C. using the electrostatic capacity at 20° C. as the standard, the change ratio ($\Delta C/C25°$ C.) at −55° C. and at 125° C. using the electrostatic capacity at 25° C. as the standard, and the absolute value ($\Delta C/C20°$ C.$|_{max}$) of the largest change ratio within the range of from −55° C. to 125° C.

After measuring, a nickel plating liquid containing nickel sulfate, nickel chloride, and boric acid was prepared and nickel plating was applied on the external silver electrodes by the barrel plating method.

Finally, a solder plating liquid composed of an AS bath (alkanolsulfonic acid) was prepared and by applying solder plating on the nickel plated layer by a barrel plating method, monolithic ceramic capacitors having external electrodes plated thereon were obtained. On the monolithic ceramic capacitor, the electrostatic capacity (C) was measured using an automatic bridge-type measurement instrument at a frequency of 1 kHz, 1 Vrms and at a temperature of 25° C.

Then, for measuring the insulation resistance (R) at an electric field of 20 kV/mm, using an insulation resistance meter, a direct current voltage of 160 V was applied for 2 minutes, the insulation resistances (R) at 25° C. and at 125° C. were measured, and the product of the electrostatic capacity (C) and the insulation resistance (R), that is the CR product, was determined. The results are shown in Table 5.

surrounded by the 6 straight lines or are not on the 6 straight lines are undesirable since they are sintering deficient or even when they are sintered, the insulation resistance is extremely lowered by plating.

Also, even when samples are in the inside of the above-described region or on the straight lines as in Sample Nos. 119 and 120, when w representing the Si amount is less than about 0.3, the samples are sintering deficient and when w representing the Si amount is about 1.0, the insulation

TABLE 5

| Sample No. | Firing Temperature (°C.) | Dielectric Constant $\epsilon$ | Dielectric Loss tan δ (%) | Capacity Temperature Change Ratio $\Delta C/C20°$ C. (%) | | Capacity Temperature Change Ratio $\Delta C/C20°$ C. (%) | | | CR Product After Plating (MΩ·μF) 20 kV/mm applied | | CR Product After Silver Baking (MΩ·μF) 20 kV/mm applied | |
|---|---|---|---|---|---|---|---|---|---|---|---|---|
| | | | | −25° C. | 85° C. | −55° C. | 125° C. | max | 25° C. | 125° C. | 25° C. | 125° C. |
| 101 | 1280 | 3330 | 1.9 | −0.4 | −6.8 | −0.6 | −8.3 | 7.9 | 2740 | 770 | 2790 | 850 |
| 102 | 1280 | 3280 | 1.8 | −0.3 | −7.8 | −0.2 | −10.0 | 10.1 | 2580 | 770 | 2580 | 770 |
| 103 | 1280 | 3160 | 2.2 | −0.2 | −7.5 | −0.5 | −9.8 | 9.8 | 2510 | 780 | 2510 | 780 |
| 104 | 1260 | 3100 | 1.7 | −0.9 | −5.5 | −1.2 | −5.6 | 5.6 | 2720 | 790 | 2750 | 820 |
| 105 | 1260 | 3050 | 1.5 | −0.6 | −5.3 | −0.8 | −5.5 | 5.5 | 2860 | 860 | 2930 | 930 |
| 106 | 1280 | 3090 | 1.6 | −0.2 | −6.0 | −0.6 | −6.8 | 6.8 | 2740 | 700 | 2900 | 900 |
| 107 | 1280 | 3130 | 1.8 | −0.7 | −6.5 | −1.1 | −6.8 | 6.8 | 2660 | 820 | 2660 | 820 |
| 108 | 1260 | 3060 | 1.7 | −0.6 | −5.7 | −0.9 | −5.9 | 5.9 | 2820 | 860 | 2850 | 880 |
| 109 | 1260 | 3100 | 1.7 | −0.8 | −6.5 | −1.0 | −6.9 | 6.9 | 2770 | 820 | 2780 | 840 |
| 110 | 1280 | 3280 | 1.8 | −0.1 | −7.5 | −0.2 | −10.0 | 10.0 | 2710 | 730 | 2710 | 740 |
| 111 | 1280 | 3100 | 1.7 | −0.7 | −6.2 | −1.0 | −6.5 | 6.5 | 3740 | 1200 | 3710 | 1230 |
| 112 | 1300 | 3090 | 1.5 | −0.3 | −7.5 | −0.4 | −9.0 | 9.0 | 3310 | 1150 | 3320 | 1160 |
| 113 | 1280 | 3060 | 1.5 | −0.1 | −8.3 | −0.1 | −10.9 | 10.9 | 3800 | 1090 | 3820 | 1100 |
| 114 | 1300 | 3030 | 1.6 | −0.4 | −7.1 | −0.5 | −7.3 | 7.3 | 3650 | 1100 | 3650 | 1110 |
| *115 | | | | Unmeasurable owing to sintering deficiency | | | | | | | | |
| *116 | | | | Unmeasurable owing to sintering deficiency | | | | | | | | |
| *117 | 1300 | 3080 | 2.1 | −1.6 | −5.3 | −2.0 | −5.0 | 5.0 | 710 | 120 | 2120 | 680 |
| *118 | 1300 | 3060 | 2.2 | −1.5 | −4.9 | −2.1 | −4.7 | 4.7 | 90 | 10 | 2410 | 580 |
| *119 | | | | Unmeasurable owing to sintering deficiency | | | | | | | | |
| *120 | 1260 | 3120 | 1.7 | −0.4 | −6.0 | −0.1 | −6.4 | 6.4 | 140 | 30 | 2900 | 920 |
| *121 | | | | Unmeasurable owing to sintering deficiency | | | | | | | | |
| *122 | | | | Unmeasurable owing to sintering deficiency | | | | | | | | |

Mark * is Outside the Range of the Invention

As is clear from Table 4 and Table 5, in the monolithic ceramic capacitor of the present invention constituted from the dielectric ceramic layers containing by addition the $Li_2O$—$B_2O_3$—(Si, Ti)$O_2$ series oxide glass, the dielectric constant $\epsilon$ is high as 3,000 or higher, the dielectric loss tan δ is 2.5% or less, and the change ratio of the electrostatic capacity to temperature satisfies the B characteristic standard of the JIS Standard within the range of from −25° C. and 85° C. and the X7R characteristic standard of the EIA Standard within the range of from −55° C. and 125° C. Furthermore, there is a feature that when plating is applied, the electric characteristics are not deteriorated.

Figure 4:
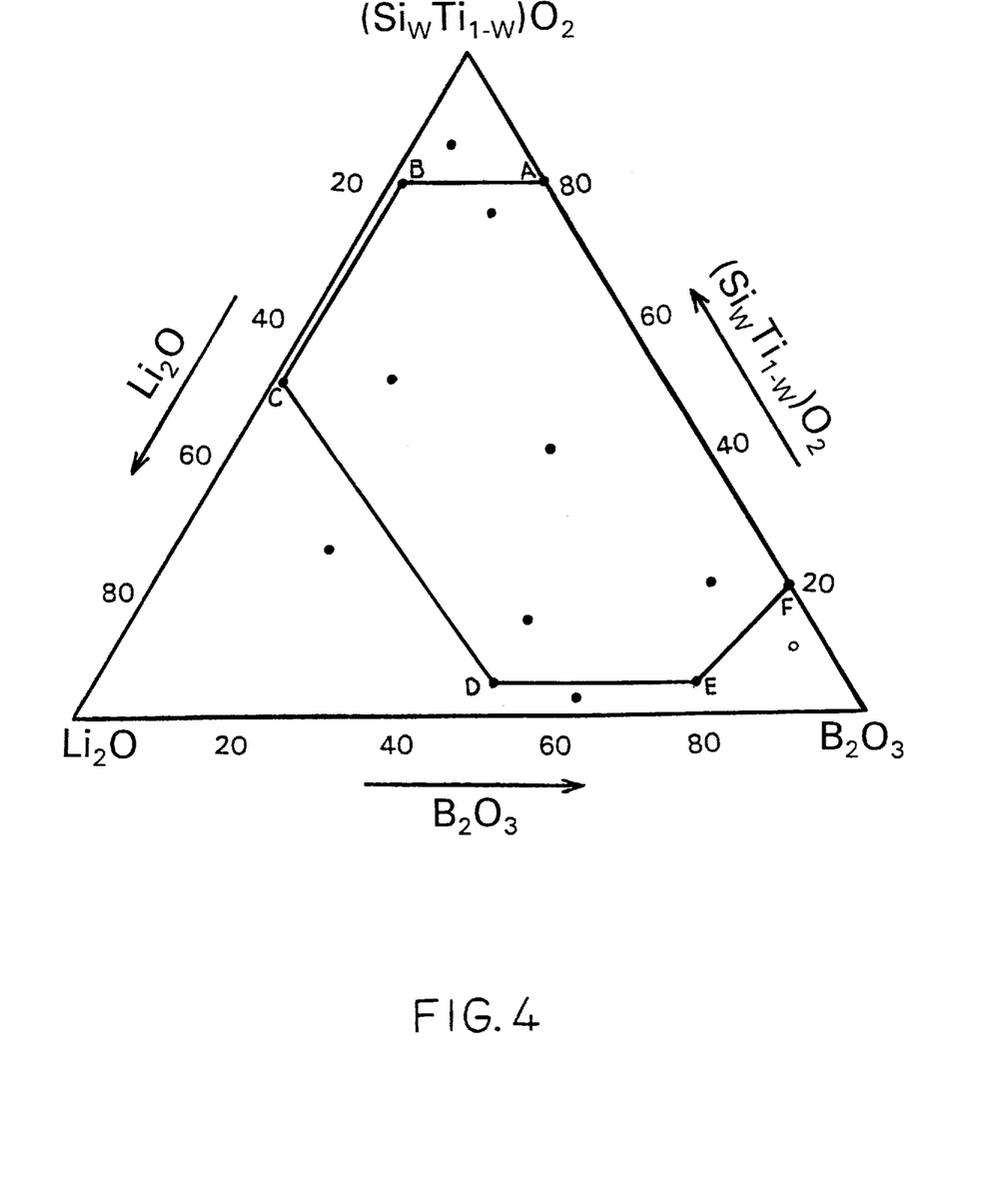
FIG. 4 is a ternary composition diagram of $\{Li_2O, B_2O_3, (Si_wTi_{1-w})O_2\}$ showing the composition range of the $Li_2O-B_2O_3-(Si, Ti)O_2$ series oxide glass.

When triangular diagram of $\{Li_2O, B_2O_3, (Si_wTi_{1-w})O_2\}$ (wherein, $0.3 \leq w < 1.0$), preferably about 0.4–0.8, is formed, the oxide glass composed of $Li_2O$—$B_2O_3$—(Si, Ti)$O_2$ is in the inside of the region surrounded by 6 straight lines or on the 6 straight lines linking 6 points, that is point A of the composition where $Li_2O$ is 0 mol %, $B_2O_3$ is 20 mol %, and (Si, Ti)$O_2$ is 80 mol %; point B of the composition where $Li_2O$ is 19 mol %, $B_2O_3$ is 1 mol %, and (Si, Ti)$O_2$ is 80 mol %; point C of the composition where $Li_2O$ is 49 mol %, $B_2O_3$ is 1 mol %, and (Si, Ti)$O_2$ is 50 mol %; point D of the composition where $Li_2O$ is 45 mol %, $B_2O_3$ is 50 mol %, and (Si, Ti)$O_2$ is 5 mol %; point E of the composition where $Li_2O$ is 20 mol %, $B_2O_3$ is 75 mol %, and (Si, Ti)$O_2$ is 5 mol %; and point F of the composition where $Li_2O$ is 0 mol %, $B_2O_3$ is 80 mol %, and (Si, Ti)$O_2$ is 20 mol %. On the other hand, Sample Nos. 115 to 118 which are outside the region resistance at 20 kV/mm after plating is extremely lowered, both of which are undesirable.

Also, as Sample Nos. 111 to 114, monolithic ceramic capacitors each having the insulation resistances at 25° C. and at 125° C. in 20 kV/mm of 3,000 MΩ·μF and 1,000 MΩ·μF, respectively, are obtained but as in Sample Nos. 121 and 122, when the addition amount of $Al_2O_3$ is over 20 parts by weight or the addition amount of $ZrO_2$ is over 10 parts by weight, the sintering property is extremely lowered, which is undesirable.

In addition, even though in the above examples the barium titanate powder was produced by an oxalic acid method, the barium titanate is not limited thereto but a barium titanate powder produced by an alkoxide method or a hydrothermal synthetic method may be used. By using these powders, it is possible that the characteristics are more improved than those shown in the Examples of this invention.

Also, though as scandium oxide, yttrium oxide, samarium oxide, europium oxide, manganese oxide, cobalt oxide, nickel oxide, magnesium oxide, etc., oxide powders were used, the invention is not limited to these powders but if they are compounded to constitute the dielectric ceramic layers of the range of the present invention, solutions of alkoxides, organic metals, etc., can be used without reducing the characteristics obtained.

As described above, because the dielectric ceramic layer is constituted by the dielectric ceramic material which is not reduced and is not converted to a semiconductor even by calcination in a reducing atmosphere, nickel, which is a base metal, or a nickel alloy can be used as the electrode material and the dielectric ceramic layer can be calcined at a relatively low temperature as 1300° C. or lower, whereby a lower cost of the monolithic ceramic capacitor can be realized.

Also, the dielectric constant is 3,000 or higher and the temperature change of the dielectric constant is small in the monolithic ceramic capacitor using the dielectric ceramic material. Also, the insulation resistance in a high electric field is high and the life time at high temperatures is long. Accordingly, even when the dielectric ceramic layer is thinned, it is unnecessary to lower the rated voltage. Furthermore, because the crystal grain size is small as 1 $\mu$m or smaller, when the dielectric ceramic layer is thinned, the amount of the crystal grains in the layer can be increased compared with conventional monolithic ceramic capacitors. Thus, a small-sized and large capacity monolithic ceramic capacitor having a high reliability can be obtained. Also, because the electric characteristics are not lowered by plating, it is possible to cope with automatic surface packaging.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor comprising at least three dielectric ceramic layers, at least two internal electrodes between adjacent dielectric ceramic layers such that an end of each of the internal electrodes is exposed at a different side surface of said capacitor, and external electrodes electrically connected to the exposed internal electrodes, wherein the dielectric ceramic layers comprise a main component comprising (a) barium titanate having a content of alkali metal oxides impurities in an amount of not more than about 0.02% by weight, (b) at least one member selected from the group consisting of scandium oxide and yttrium oxide, (c) at least one member selected from the group consisting of samarium oxide and europium oxide, and (d manganese oxide, cobalt oxide and nickel oxide, said main component having the following composition formula $$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$$

wherein $M_2O_3$ is at least one member selected from the group consisting of $Sc_2O_3$ and $Y_2O_3$; $Re_2O_3$ is at least one member selected from the group consisting of $Sm_2O_3$ and $Eu_2O_3$ and $\alpha$, $\beta$, $\gamma$, m, x, and y are $0.0025 \leq \alpha+\beta \leq 0.025$ $0 < \beta \leq 0.0075$ $0.0015 \leq \gamma \leq 0.05$ $\gamma/(\alpha+\beta) \leq 4$ $0 \leq x < 1.0$ $0 \leq y < 1.0$ $0 \leq x+y < 1.0$

$1.000 < m \leq 1.035$;

magnesium oxide in an amount of from about 0.5 to 5.0 mols as MgO to 100 mols of said main constituent; and an $Li_2O$—$B_2O_3$—(Si, Ti)$O_2$ oxide glass in an amount of from about 0.2 to 3.0 parts by weight to 100 parts by weight of the sum total of said main constituent and said magnesium oxide.

2. The monolithic ceramic capacitor of claim 1, wherein $0.006 \leq \alpha+\beta \leq 0.02$, $0.001 < \beta \leq 0.005$, $0.0025 \leq \gamma \leq 0.04$, $\gamma/(\alpha+\beta) \leq 3.6$, $0.15 \leq x+y < 0.5$, $1.005 < m \leq 1.03$; about 1–4 mols MgO to 100 mols of said main constituent; and about 1–2.5 pph glass.

3. The monolithic ceramic capacitor of claim 2, wherein said $Li_2O$—$B_2O_3$—(Si, Ti)$O_2$ oxide glass is in the inside of the region of a mol % triangular diagram of:

wherein $0.3 \leq w < 1.0$, surrounded by or on the straight lines linking 6 points of

A (0, 20, 80)

B (19, 1, 80)

C (49, 1, 50)

D (45, 50, 5)

E (20, 75, 5)

F (0, 80, 20)

and contains at least one member selected from the group consisting of $Al_2O_3$ and $ZrO_2$ in the sum total of not more than about 20 parts by weight, with the proviso that $ZrO_2$ is not more than about 10 parts by weight, to 100 parts by weight of said glass.

4. The monolithic ceramic capacitor of claim 3, wherein said internal electrodes are nickel or a nickel alloy.

5. The monolithic ceramic capacitor of claim 2, wherein said external electrode comprises a sintered layer of an electrically conductive metal powder or an electrically conductive metal powder and glass frit.

6. The monolithic ceramic capacitor of claim 4, wherein said external electrode comprises a first layer sintered layer of an electrically conductive metal powder or an electrically conductive metal powder and glass frit and a second layer plated layer on the first layer.

7. The monolithic ceramic capacitor of claim 1, wherein said $Li_2O$—$B_2O_3$—(Si, Ti)$O_2$ oxide glass is in the inside of the region of a mol % triangular diagram of:

wherein $0.3 < w < 1.0$, surrounded by or on the straight lines linking 6 points of

A (0, 20, 80)

B (19, 1, 80)

C (49, 1, 50)

D (45, 50, 5)

E (20, 75, 5)

F (0, 80, 20)

and contains at least one member selected from the group consisting of $Al_2O_3$ and $ZrO_2$ in the sum total of not more than about 20 parts by weight, with the proviso that $ZrO_2$ is not more than about 10 parts by weight, to 100 parts by weight of said glass.

8. The monolithic ceramic capacitor of claim 7, wherein said internal electrodes are nickel or a nickel alloy.

9. The monolithic ceramic capacitor of claim 8, wherein said external electrode comprises a sintered layer of an electrically conductive metal powder or an electrically conductive metal powder and glass frit.

10. The monolithic ceramic capacitor of claim 8, wherein said external electrode comprises a first layer sintered layer of an electrically conductive metal powder or an electrically conductive metal powder and glass frit and a second layer plated layer on the first layer.

11. The monolithic ceramic capacitor of claim 1, wherein said internal electrodes are nickel or a nickel alloy.

12. The monolithic ceramic capacitor of claim 11, wherein said external electrode comprises a sintered layer of an electrically conductive metal powder or an electrically conductive metal powder and glass frit.

13. The monolithic ceramic capacitor of claim 11, wherein said external electrode comprises a first layer sintered layer of an electrically conductive metal powder or an electrically conductive metal powder and glass frit and a second layer plated layer on the first layer.

14. The monolithic ceramic capacitor of claim 1, wherein said external electrode comprises a sintered layer of an electrically conductive metal powder or an electrically conductive metal powder and glass frit.

15. The monolithic ceramic capacitor of claim 1, wherein said external electrode comprises a first layer sintered layer of an electrically conductive metal powder or an electrically conductive metal powder and glass frit and a second layer plated layer on the first layer.

* * * * *